US012362089B2

(12) United States Patent
Tomonari et al.

(10) Patent No.: US 12,362,089 B2
(45) Date of Patent: Jul. 15, 2025

(54) COMMON MODE FILTER

(71) Applicant: TDK Corporation, Tokyo (JP)

(72) Inventors: Toshio Tomonari, Tokyo (JP); Tsutomu Kobayashi, Tokyo (JP); Kazunori Arimitsu, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 18/633,202

(22) Filed: Apr. 11, 2024

(65) Prior Publication Data

US 2024/0258015 A1 Aug. 1, 2024

Related U.S. Application Data

(60) Continuation of application No. 18/072,845, filed on Dec. 1, 2022, now Pat. No. 11,984,253, which is a (Continued)

(30) Foreign Application Priority Data

Oct. 5, 2012 (JP) ................................ 2012-223249

(51) Int. Cl.
*H01F 27/28* (2006.01)
*H01F 1/047* (2006.01)

(Continued)

(52) U.S. Cl.
CPC ......... *H01F 27/2823* (2013.01); *H01F 1/047* (2013.01); *H01F 17/045* (2013.01); *H01F 27/24* (2013.01); *H01F 27/28* (2013.01)

(58) Field of Classification Search
CPC ...... H01F 27/2823; H01F 27/28; H01F 27/24; H01F 17/045; H01F 1/047

(Continued)

(56) References Cited

U.S. PATENT DOCUMENTS 5,483,208 A 1/1996 Spriester
7,256,673 B2 8/2007 Okumura et al.

(Continued)

FOREIGN PATENT DOCUMENTS

JP 48-033347 A 5/1973
JP 2002-246244 A 8/2002

(Continued)

OTHER PUBLICATIONS

U.S. PTO Notice of Allowance issued in related U.S. Appl. No. 17/141,695 dated Sep. 21, 2022.

(Continued)

*Primary Examiner* — Tszfung J Chan
(74) *Attorney, Agent, or Firm* — Rimon P.C.

(57) ABSTRACT

Disclosed herein is a common mode filter that comprises a drum core including a winding core portion and a pair of flange portions provided at both ends of the winding core portion, and first and second wires wound around the winding core portion so as to form a pair-wire for each turn. The first and second wires includes one or a plurality of sparsely-wound portions in which the first and second wires are wound with adjacent pair-wires spaced from each other, and one or a plurality of closely-wound portions in which the first and second wires are wound with adjacent pair-wires in close contact with each other.

20 Claims, 9 Drawing Sheets

Related U.S. Application Data continuation of application No. 17/141,695, filed on Jan. 5, 2021, now Pat. No. 11,545,296, which is a continuation of application No. 16/928,407, filed on Jul. 14, 2020, now Pat. No. 10,910,144, which is a continuation of application No. 16/690,691, filed on Nov. 21, 2019, now Pat. No. 10,755,848, which is a continuation of application No. 16/011,887, filed on Jun. 19, 2018, now Pat. No. 10,522,283, which is a division of application No. 15/142,437, filed on Apr. 29, 2016, now Pat. No. 10,037,844, which is a continuation of application No. 14/045,393, filed on Oct. 3, 2013, now Pat. No. 9,362,041.

(51) Int. Cl.
*H01F 17/04* (2006.01)
*H01F 27/24* (2006.01)

(58) Field of Classification Search
USPC .......... 336/83, 187, 188, 189, 192, 221, 222
See application file for complete search history.

(56) References Cited

U.S. PATENT DOCUMENTS

| | | | |
|---|---|---|---|
| 2005/0052267 | A1 | 3/2005 | Singu et al. |
| 2006/0170526 | A1 | 8/2006 | Okumura et al. |
| 2008/0309445 | A1 | 12/2008 | Suzuki et al. |
| 2009/0045902 | A1 | 2/2009 | Hirai |
| 2009/0295525 | A1 | 12/2009 | Okawa |
| 2010/0109827 | A1 | 5/2010 | Asou et al. |
| 2010/0148912 | A1 | 6/2010 | Nakatani et al. |

FOREIGN PATENT DOCUMENTS

| | | | | | |
|---|---|---|---|---|---|
| JP | 2003-234218 | A | | 8/2003 | |
| JP | 2004146683 | A | * | 5/2004 | |
| JP | 2006-049383 | A | | 2/2006 | |
| JP | 3973028 | B2 | | 9/2007 | |
| JP | 2007-324380 | A | | 12/2007 | |
| JP | 2008-034777 | A | | 2/2008 | |
| JP | 2008-091359 | A | | 4/2008 | |
| JP | 2009021558 | A | * | 1/2009 | ......... H01F 27/2823 |
| JP | 2009-094389 | A | | 4/2009 | |
| JP | 4737268 | B2 | | 7/2011 | |
| JP | 2011138914 | A | * | 7/2011 | |
| JP | 4789076 | B2 | | 10/2011 | |
| JP | 2011-253888 | A | | 12/2011 | |

OTHER PUBLICATIONS

Entire U.S. PTO associated with related U.S. Appl. No. 17/141,695, filed Jan. 5, 2021.
Office Action issued in related U.S. Appl. No. 15/142,437, dated May 18, 2017.
Office Action issued in related U.S. Appl. No. 15/142,437, dated Nov. 15, 2017.
Notice of Allowance issued in related U.S. Appl. No. 15/142,437, dated Mar. 29, 2018.
Notice of Allowance issued in related U.S. Appl. No. 16/011,887, dated Sep. 5, 2019.
Notice of Allowance issued in related U.S. Appl. No. 14/045,393, dated Feb. 12, 2016.
Office Action issued in related U.S. Appl. No. 14/045,393, dated May 13, 2015.
Office Action issued in related U.S. Appl. No. 14/045,393, dated Nov. 18, 2015.
Entire U.S. PTO associated with related U.S. Appl. No. 16/011,887, filed Jun. 19, 2018.
U.S. PTO Notice of Allowance issued in related U.S. Appl. No. 16/690,691, dated Jun. 16, 2020.
Entire U.S. PTO associated with related U.S. Appl. No. 16/690,691, filed Nov. 21, 2019.
U.S. PTO Notice of Allowance issued in related parent U.S. Appl. No. 16/928,407, dated Oct. 15, 2020.
Entire U.S. PTO associated with related parent U.S. Appl. No. 16/928,407, filed Jul. 14, 2020.
USPTO Non-Final Rejection issued in related U.S. Appl. No. 18/072,845 dated Aug. 17, 2023.
USPTO Notice of Allowance issued in related U.S. Appl. No. 18/072,845 dated Jan. 17, 2024.
Entire USPTO associated with related U.S. Appl. No. 18/072,845, filed Dec. 1, 2022.

* cited by examiner

COMMON MODE FILTER

CROSS REFERENCE TO RELATED APPLICATIONS

This application is a Continuation of U.S. patent application Ser. No. 18/072,845, filed Dec. 1, 2022, which is a Continuation of U.S. patent application Ser. No. 17/141,695 filed on Jan. 5, 2021, now U.S. Pat. No. 11,545,296, issued Jan. 3, 2023, which is a Continuation of U.S. patent application Ser. No. 16/928,407 filed on Jul. 14, 2020, now U.S. Pat. No. 10,910,144, issued Feb. 2, 2021, which is a Continuation of U.S. patent application Ser. No. 16/690,691 filed on Nov. 21, 2019, now U.S. Pat. No. 10,755,848 issued on Aug. 25, 2020, which is a Continuation of U.S. patent application Ser. No. 16/011,887 filed on Jun. 19, 2018, now U.S. Pat. No. 10,522,283 issued on Dec. 31, 2019, which is a Divisional of U.S. patent application Ser. No. 15/142,437 filed on Apr. 29, 2016, now U.S. Pat. No. 10,037,844 issued on Jul. 31, 2018, which is a Continuation of U.S. patent application Ser. No. 14/045,393 filed on Oct. 3, 2013, now U.S. Pat. No. 9,362,041 issued on Jun. 7, 2016, which claims the benefit of Japanese Patent Application No. 2012-223249 filed on Oct. 5, 2012, the entire contents of each are hereby incorporated in their entirety.

BACKGROUND OF THE INVENTION

Field of the Invention

The present invention relates to a common mode filter, and more particularly relates to a common mode filter configured by using a drum core.

Description of Related Art

There is a known common mode filter that is provided on each of two signal lines constituting a transmission path using a differential transmission method, and that is configured by two inductances magnetically coupled with each other. By inserting the common mode filter into the transmission path using a differential transmission method, it is possible to selectively remove only a common-mode noise current.

It is known that a toroidal core or a drum core is used as a specific structure of the common mode filter. In the case of using the toroidal core, a leakage flux can be suppressed as compared to the case of using the drum core, and therefore high noise-removal performance can be obtained. On the other hand, because automatic coil winding is difficult for the toroidal core, it inevitably requires manual coil winding, thereby increasing variations in characteristics of the common mode filter. In contrast to this, in the case of using the drum core, it is difficult to obtain as high noise-removal performance as that of the toroidal core. On the other hand, an automatic coil winding method can be used, thereby lessening variations in characteristics of the common mode filter. Further, because the automatic coil winding method can be utilized, a drum-core type common mode filter is suitable for mass production.

Japanese Patent Nos. 4789076 and 3973028 disclose an example of a common mode filter configured by using a drum core. In the example of Japanese Patent No. 4789076, two wires each of which constitutes an inductance are wound with a double-layer structure. In contrast, in the example of Japanese Patent No. 3973028, two wires each of which constitutes an inductance are wound together as a pair of wires. Generally, the former winding method is referred to as "layer winding", and the latter winding method is referred to as "bifilar winding". Furthermore, Japanese Patent No. 4737268 discloses an example of an automatic coil winder that is used to wind a wire around a drum core.

In recent years, Ethernet has been widely adopted as an in-vehicle LAN. A common mode filter used in in-vehicle Ethernet is required to have more stable characteristics and higher noise-reduction performance than ever before. In this respect, a drum-core type common mode filter has a feature of being able to lessen variations in its characteristics, as described above. Therefore, when noise-reduction performance of the drum-core type common mode filter can be improved, it is possible to obtain the optimized common mode filter for in-vehicle Ethernet.

What is specifically required as high noise-reduction performance is reduction in mode conversion characteristics (Scd) which indicate the rate of a differential signal component, input to a common mode filter, to be converted into a common mode noise and to be output. As a result of extensive studies by the present inventors in order to satisfy the requirement, it has been found that a capacitance caused between different turns (hereinafter, "capacitance between different turns") is closely associated with the reduction in the mode conversion characteristics in a common mode filter configured by using a drum core. The mode conversion characteristics are reduced by reducing the capacitance between different turns.

As disclosed in Japanese Patent No. 3973028 for example, the capacitance between different turns can be reduced by providing a given space (a "b" portion in FIG. 2 in Japanese U.S. Pat. No. 3,973,028) between pairs of wires wound by bifilar winding. Such a winding method is employed in Japanese Patent No. 3973028 for the purpose of increasing a cutoff frequency, and there is no description of the mode conversion characteristics in Japanese Patent No. 3973028. On the other hand, in the winding method as described in Japanese Patent No. 3973028, each of spaces of equal width is provided between any two adjacent turns, and therefore the number of windings is decreased. The actual number of windings in the common mode filter in Japanese Patent No. 3973028 is only four turns, and an inductance (300 μH), required for a common mode filter utilized in in-vehicle Ethernet, cannot be obtained from the four turns.

SUMMARY

Therefore, an object of the present invention is to provide a drum-core type common mode filter that can realize a high inductance, while achieving reduction in mode conversion characteristics by reducing a capacitance between different turns.

In order to achieve the above object, a common mode filter of the present invention comprises a drum core that includes a winding core portion and a pair of flange portions provided at both ends of the winding core portion, and first and second wires that are wound around the winding core portion so as to form a pair-wire for each turn, wherein the first and second wires include one or a plurality of sparsely-wound portions in which the first and second wires are wound with adjacent pair-wires spaced from each other, and one or a plurality of closely-wound portions in which the first and second wires are wound with adjacent pair-wires in close contact with each other.

The present inventors have found that in view of reducing mode conversion characteristics, sufficient reduction in a capacity between different turns can be achieved by providing a space between only a part of adjacent pair-wires, without having a configuration in which a space is provided between each of adjacent pair-wires as disclosed in Japanese Patent No. 3973028. The present invention is based on these new findings, in which while the one or plurality of sparsely-wound portions are provided to reduce the mode conversion characteristics, the one or plurality of closely-wound portions are provided to enable a higher inductance to be obtained as compared to the case where a space is provided between each of adjacent pair-wires.

In the above common mode filter, the first and second wires can be wound in order that a relationship between the number of each of the pair-wires counted from one of the pair of flange portions and arrangement of the one or plurality of sparsely-wound portions, and a relationship between the number of each of the pair-wires counted from the other flange portion and arrangement of the one or plurality of sparsely-wound portions are substantially the same with each other. With this configuration, the mounting directionality can be reduced.

In each of the above common mode filters, the one or the plurality of sparsely-wound portions can include a first sparsely-wound portion, the one or the plurality of closely-wound portions can include first and second closely-wound portions, and the first sparsely-wound portion can be arranged between the first and second closely-wound portions. With this configuration, the number of spaces can be reduced to a minimum (=1), and accordingly it is possible to increase the number of windings.

In this common mode filter, the first and second wires can be wound by layer winding in which the second wire is wound as a first layer, and the first layer is wound as a second wire, and the first and second wires can be wound in order that a relationship between the number of each of the pair-wires counted from one of the pair of flange portions and a position at which the first wire falls to the first layer at an end of the first closely-wound portion, and a relationship between the number of each of the pair-wires counted from the other flange portion and a position at which the first wire falls to the first layer at an end of the second closely-wound portion are substantially the same with each other. With this configuration, the mounting directionality can further be reduced.

In this common mode filter, the first and second wires are wound by bifilar winding, and the first and second wires can cross each other within the first sparsely-wound portion. With this configuration, the polarities are opposite to each other on both sides of the first sparsely-wound portion, and therefore it is possible to balance the polarities.

In each of the above common mode filters, the one or the plurality of sparsely-wound portions can include first and second sparsely-wound portions, the one or the plurality of closely-wound portions can include a first closely-wound portion, and the first closely-wound portion can be arranged between the first and second sparsely-wound portions. With this configuration, a capacitance between different turns can be reduced at a position close to both ends of the winding core portion, which have a large influence on reducing the mode conversion characteristics, and therefore it is possible to reduce the capacitance between different turns efficiently.

Also in this common mode filter, the one or the plurality of closely-wound portions further can include second and third closely-wound portions, and the first and second sparsely-wound portions and the first to third closely-wound portions can be arranged from one of the pair of flange portions to the other flange portion in order of the second closely-wound portion, the first sparsely-wound portion, the first closely-wound portion, the second sparsely-wound portion, and the third closely-wound portion.

Further in this common mode filter, each of the first and second sparsely-wound portions can include a predetermined number of the pair-wires, distances between the adjacent pair-wires in the first sparsely-wound portion can be increasingly shorter in order from a position closer to one of the pair of flange portions, and distances between the adjacent pair-wires in the second sparsely-wound portion can be increasingly shorter in order from a position closer to the other flange portion. With this configuration, the width of spaces increasingly larger as the spaces are positioned closer to both ends of the winding core portion, which have a large influence on reducing the mode conversion characteristics, and therefore it is possible to reduce the capacitance between different turns efficiently.

In each of the above common mode filters, the first and second wires can be wound by layer winding. With this configuration, it is possible to increase the number of windings as compared to the case of bifilar winding. Certainly, in each of the above common mode filters, the first and second wires can also be wound by bifilar winding.

According to the present invention, while one or a plurality of sparsely-wound portions are provided to achieve reduction in mode conversion characteristics, one or a plurality of closely-wound portions are provided to enable a higher inductance to be obtained as compared to the case where a space is provided between each of adjacent pair-wires.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be explained in detail with reference to the drawings.

Figure 1:
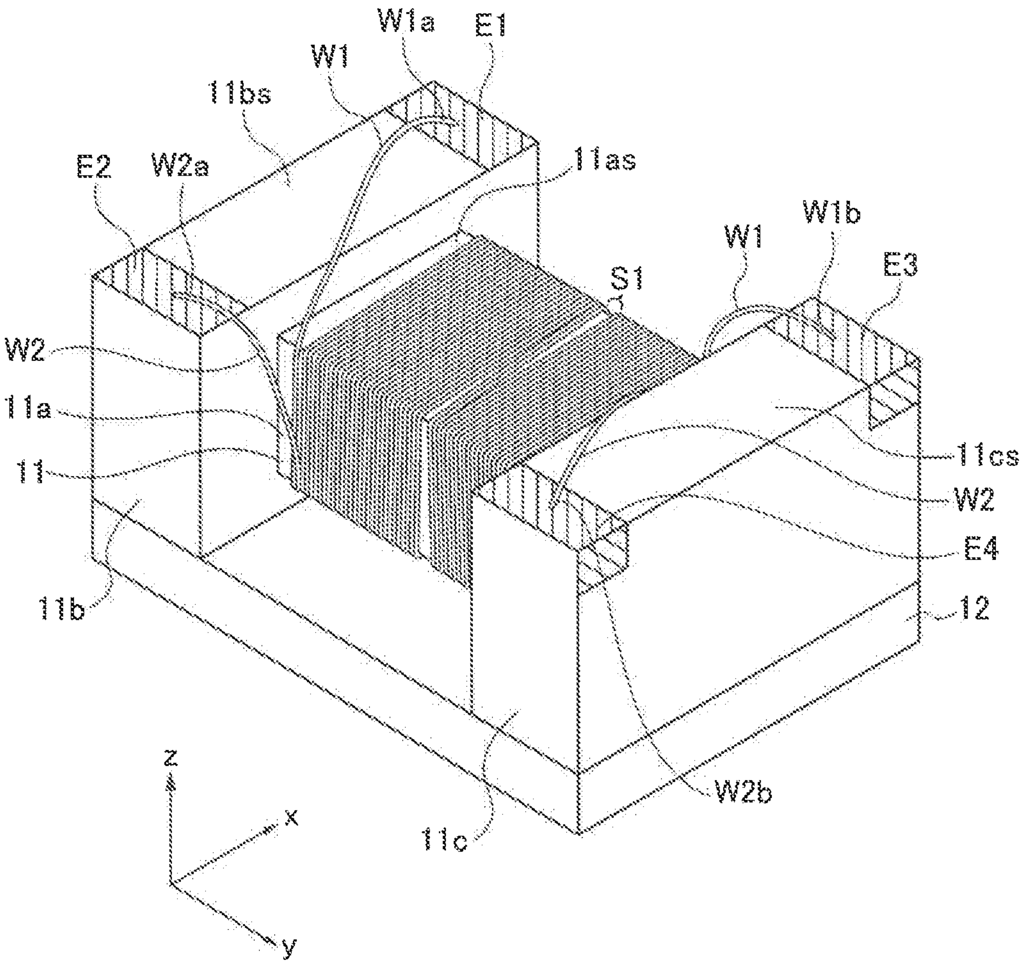
FIG. 1 is a schematic perspective view of an exterior structure of a surface-mount common mode filter according to a first embodiment of the present invention.
Figure 2A:
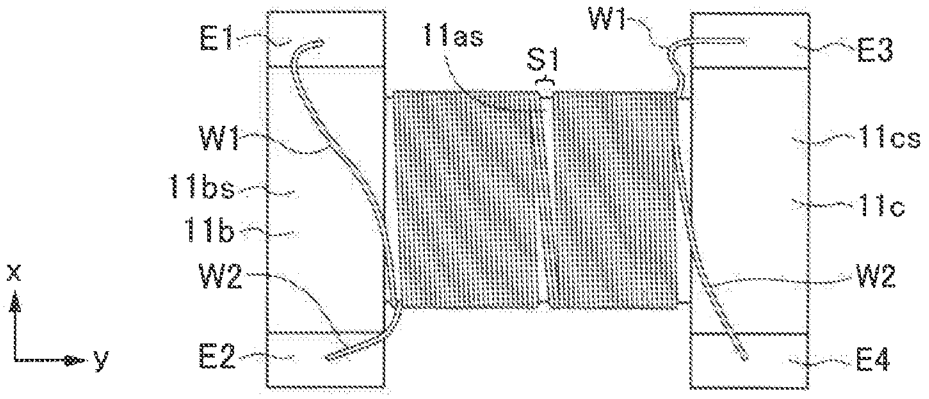
FIGS. 2A to 2D are plan views of the common mode filter shown in FIG. 1 with a plate core removed, when viewed respectively from four directions in an x-z plane.
Figure 2B:
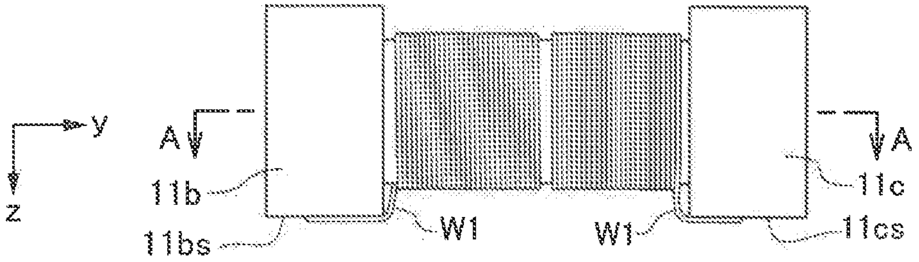
Figure 2C:
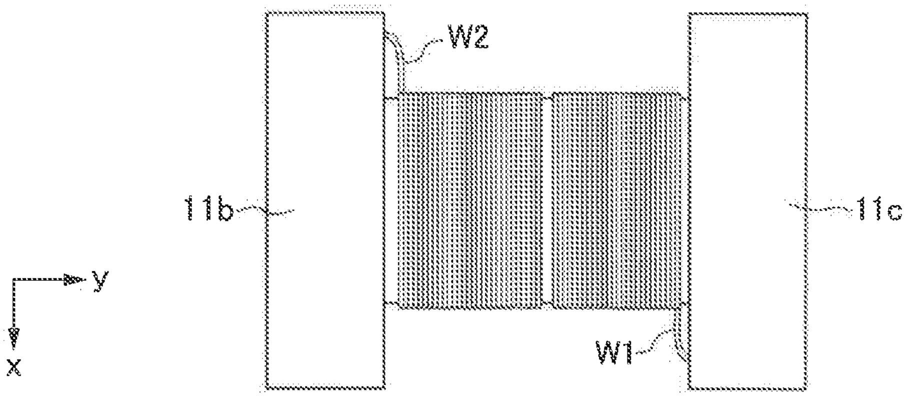
Figure 2D:
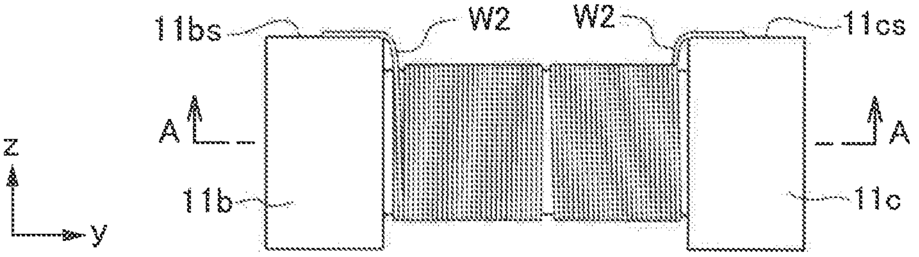

FIG. 1 is a schematic perspective view of an exterior structure of a surface-mount common mode filter 10 according to a first embodiment of the present invention. FIGS. 2A to 2D are plan views of the common mode filter 10 with a plate core 12 (described later) removed, when viewed respectively from four directions in an x-z plane (a plane perpendicular to the y direction). In the present embodiments, as shown in FIG. 1, a direction in which a pair of flange portions 11*b* and 11*c* (described later) are opposed to each other is referred to as "y direction", a direction perpendicular to the y direction in a plane of upper surfaces 11*bs* and 11*cs* (described later) is referred to as "x direction", and a direction perpendicular to both the x direction and the y direction is referred to as "z direction".

As shown in FIG. 1, the common mode filter 10 is configured by including a drum core 11, the plate core 12 attached to the drum core 11, and wires W1 and W2 (first and second wires) wound around the drum core 11. The drum core 11 includes a bar-shaped winding core portion 11*a* that is rectangular in cross section, and the flange portions 11*b* and 11*c* that are provided at both ends of the winding core portion 11*a*. The drum core 11 has a structure in which the winding core portion 11*a* and the flange portions 11*b* and 11*c* are integrated with each other. The drum core 11 is installed on a substrate for use, and is affixed to the substrate in a state where an upper surface 11*as* of the winding core portion 11*a*, and the upper surfaces 11*bs* and 11*cs* of the flange portions 11*b* and 11*c* are opposed to the substrate. The plate core 12 is fixedly attached to lower surfaces of the flange portions 11*b* and 11*c* (opposite surfaces to the upper surfaces 11*bs* and 11*cs*).

The drum core 11 and the plate core 12 are formed by sintering a magnetic material with relatively high permeability, such as Ni—Zn-based ferrite or Mn—Zn-based ferrite. The high-permeability magnetic material such as Mn—Zn-based ferrite is normally conductive with low specific resistance.

Two terminal electrodes E1 and E2 are formed on the upper surface 11*bs* of the flange portion 11*b*. Two terminal electrodes E3 and E4 are formed on the upper surface 11*cs* of the flange portion 11*c*. The terminal electrodes E1 and E2 are arranged in this order from one-end side in the x direction. Similarly, the terminal electrodes E3 and E4 are also arranged in this order from one-end side in the x direction. Respective ends of the wires W1 and W2 are joined to the terminal electrodes E1 to E4 by thermocompression bonding.

The wires W1 and W2 are covered conductive wires, and are both wound around the winding core portion 11*a* in the same winding direction to constitute a coil conductor. The number of turns of the wire W1 and the number of turns of the W2 are the same with each other and a pair-wire is formed for each turn. In the first embodiment, the wires W1 and W2 are wound by layer winding to have a double-layer structure. A space is provided between adjacent pair-wires positioned in the middle of the winding core portion 11*a*, thereby constituting a sparsely-wound portion S1. This point is explained again in detail later. In an area except the sparsely-wound portion S1, the wires W1 and W2 are wound with adjacent pair-wires in close contact with each other. One end W1*a* of the wire W1 (an end on the side of the flange portion 11*b*) and the other end W1*b* (an end on the side of the flange portion 11*c*) are respectively joined to the terminal electrodes E1 and E3. One end W2*a* of the wire W2 (an end on the side of the flange portion 11*b*) and the other end W2*b* (an end on the side of the flange portion 11*c*) are respectively joined to the terminal electrodes E2 and E4.

Figure 3:
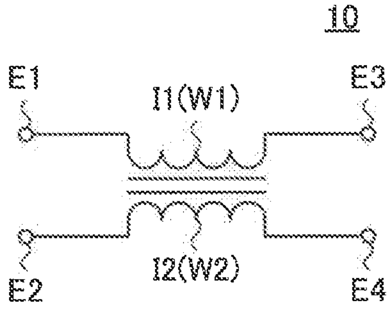
FIG. 3 is an electric circuit diagram realized by the common mode filter shown in FIG. 1.

FIG. 3 is an electric circuit diagram realized by the common mode filter 10. As shown in FIG. 3, the common mode filter 10 has a configuration in which an inductor I1, connected between the terminal electrodes E1 and E3, and an inductor I2, connected between the terminal electrodes E2 and E4, are magnetically coupled with each other. The inductors I1 and I2 are configured by the wires W1 and W2, respectively. With this configuration, when the terminal electrodes E1 and E2 are used as an input terminal, and the terminal electrodes E3 and E4 are used as an output terminal, a differential signal input from the input terminal is hardly affected by the common mode filter 10, and is output from the output terminal. In contrast, a common mode noise input from the input terminal is attenuated to a large extent by the common mode filter 10, and is hardly output to the output terminal.

A common mode filter generally has properties of converting a part of a differential signal, input to an input terminal of the common mode filter, into a common mode noise, and outputting the common mode noise from an output terminal. Because these properties are certainly not desirable, it is necessary to reduce the rate of the differential signal to be converted into the common mode noise (the mode conversion characteristics (Scd) described above) to a given level or lower. Apart from that, it is also necessary for the common mode filter to increase the number of windings of a wire to as many as possible, in order to obtain a required inductance even from a small size. In the common mode filter 10 according to the first embodiment, while the sparsely-wound portion S1 is provided to reduce a capacitance between different turns, the wires W1 and W2 are closely wound in an area other than the sparsely-wound portion S1, thereby simultaneously solving the two problems described above. This solution is explained below in detail.

Figure 4:
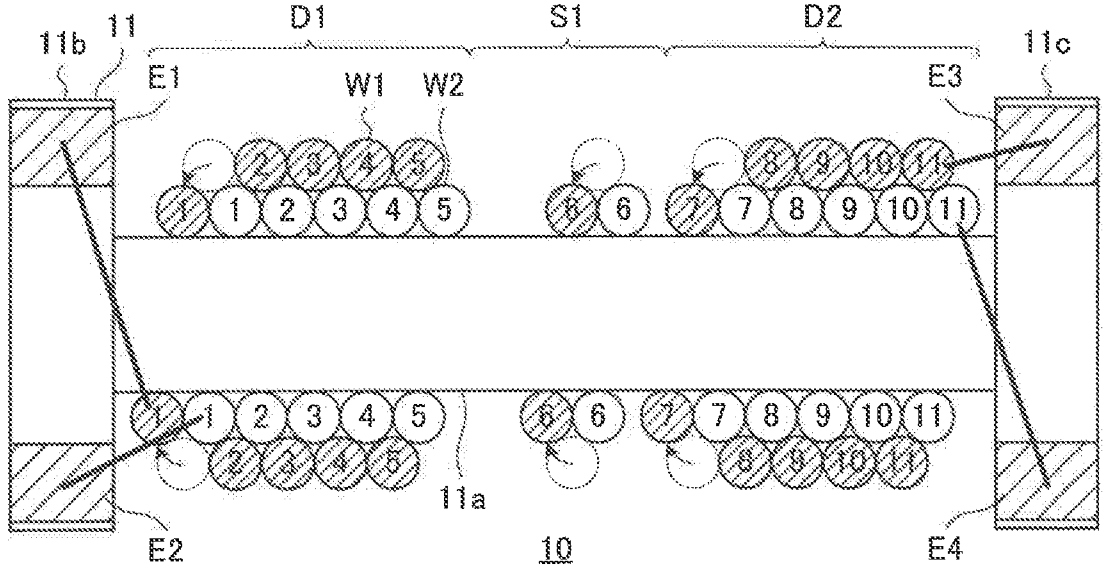
FIG. 4 is a schematic diagram showing a winding state of the wires in the common mode filter shown in FIG. 1.

FIG. 4 is a schematic diagram showing a winding state of the wires W1 and W2 in the common mode filter 10. Among constituent elements shown in FIG. 4, an area covering the wires W1 and W2 and the winding core portion 11*a* is shown as a cross-sectional view taken along the line A-A shown in FIGS. 2B and 2D. An area covering the flange portions 11*b* and 11*c* is shown as a top view shown also in FIG. 2A.

The number shown within each of the wires W1 and W2 in FIG. 4 is an illustration of the order of the turn (the turn number of each of the pair-wires) when the number of pair-wires is counted from the end on the side of the flange portion 11*b*. In the example in FIG. 4, the maximum value of the turn number is 11. However, the actual number of turns is approximately 40. In FIG. 4, because priority is given to ease of viewing the drawing, a significantly-reduced number of windings of the wires W1 and W2 are shown in a closely-wound portion (described later). In FIG. 4, the connection relationship between the wires W1 and W2 and the terminal electrodes E1 to E4 is schematically shown by thick straight lines. These points are also applied to the drawings explained later.

As shown in FIG. 4, the wires W1 and W2 according to the first embodiment include a first sparsely-wound portion S1 in which the wires W1 and W2 are wound with adjacent pair-wires spaced from each other, and first and second closely-wound portions D1 and D2 in which the wires W1 and W2 are wound with adjacent pair-wires in close contact with each other. The first closely-wound portion D1, the first sparsely-wound portion S1, and the second closely-wound portion D2 are arranged in this order from the flange portion 11*b* to the flange portion 11*c*. The wires W1 and W2 with the turn numbers 1 to 5 are included in the first closely-wound portion D1. The wires W1 and W2 with the turn number 6 are included in the first sparsely-wound portion S1. The wires W1 and W2 with the turn numbers 7 to 11 are included in the second closely-wound portion D2.

In the first embodiment, one turn (the turn number 6) of each of the wires W1 and W2 is included in the first sparsely-wound portion S1. However, a turn of each of the wires W1 and W2 is not necessarily included in the first sparsely-wound portion S1. This point is also applied to other embodiments described later.

By providing the first sparsely-wound portion S1 as described above, it is possible for the common mode filter 10 according to the first embodiment to reduce the capacitance between different turns in the wires W1 and W2 as compared to the case where no sparsely-wound portion is provided. Therefore, the mode conversion characteristics are also reduced. Meanwhile, because the first and second closely-wound portions D1 and D2 are provided, it is possible for the common mode filter 10 according to the first embodiment to obtain a higher inductance as compared to the case where a space is provided between each of adjacent pair-wires.

Figure 5A:
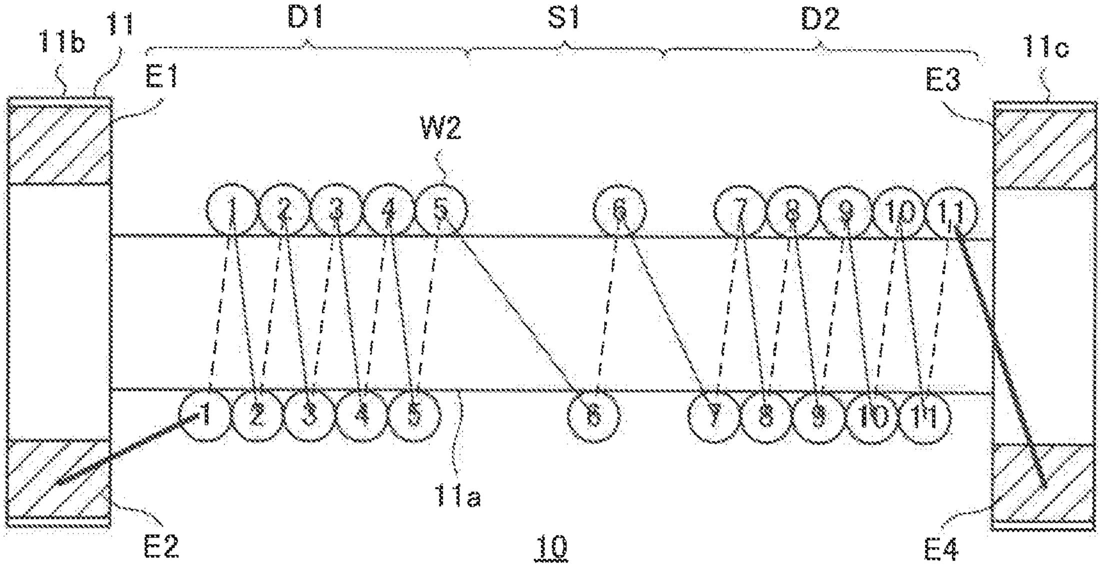
FIGS. 5A and 5B are explanatory diagrams of a winding method of the wires shown in FIG. 4.
Figure 5B:
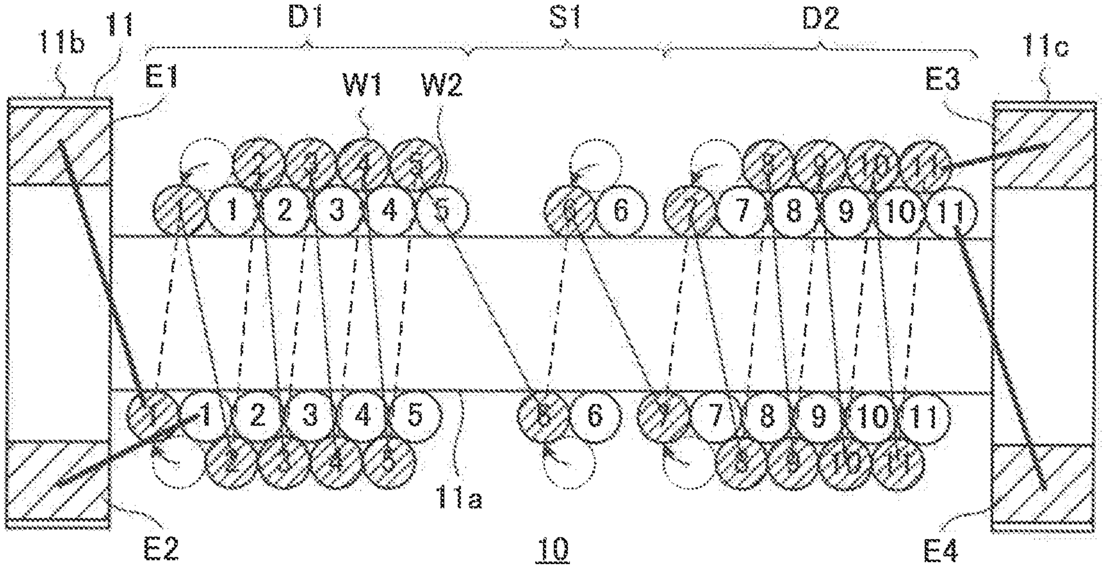

FIGS. 5A and 5B are explanatory diagrams of a winding method of the wires W1 and W2 shown in FIG. 4. Each of a straight line and a broken line shown in FIGS. 5A and 5B connects between cross sections of a wire. The straight line schematically shows the wire located on the front side of the winding core portion 11*a* in the drawings. The broken line schematically shows the wire located on the rear side of the winding core portion 11*a* in the drawings. The method of winding the wires W1 and W2 that include the first and second closely-wound portions D1 and D2, and the first sparsely-wound portion S1 is briefly explained below with reference to FIGS. 5A and 5B.

The wires W1 and W2 are wound around the winding core portion 11*a* using an automatic coil winder (not shown). Specifically, as this automatic coil winder, it is preferable to use an automatic coil winder disclosed in Japanese Patent No. 4737268, for example. Assuming that the automatic coil winder disclosed in Japanese Patent No. 4737268 is used, in winding the wires W1 and W2, first, one end of the wire W2 wound as a first layer is joined to the terminal electrode E2, and then while the drum core 11 is rotated about a rotation axis along the y direction at a constant speed, a nozzle that feeds the wire W2 is moved in the y direction (FIG. 5A). At this time, in an area covering the first and second closely-wound portions D1 and D2, the moving speed of the nozzle is adjusted so as not to create a gap between adjacent pair-wires. In contrast, in an area covering the first sparsely-wound portion S1, the moving speed of the nozzle is adjusted so as to create a space of appropriate size between adjacent pair-wires. The moving speed becomes slowest when the wire W2 is wound so as not to create a gap, and becomes faster as a larger space is formed. It is necessary to keep the moving speed of the nozzle constant in the first and second closely-wound portions D1 and D2. However, the moving speed of the nozzle is not necessarily kept constant in the first sparsely-wound portion S1. When winding of the wire W2 is finished, the drum core 11 is stopped rotating, and the other end of the wire W2 is joined to the terminal electrode E4.

Next, one end of the wire W1 wound as a second layer is joined to the terminal electrode E1, and then while the drum core 11 is rotated again at a constant speed, a nozzle that feeds the wire W1 is moved in the y direction (FIG. 5B). At this time, in an area covering the first and second closely-wound portions D1 and D2, the moving speed of the nozzle is adjusted so as to precisely fit the wire W1 between the wires W2. However, because the number of windings of the wire W1 and the number of windings of the wire W2 are the same with each other in either of the first and second closely-wound portions D1 and D2, at one of the ends of each of the first and second closely-wound portions D1 and D2, the wire W1 falls to the first layer as shown in FIG. 5B. In FIG. 5B, the wire W1 with the turn number 1, positioned at the end of the first closely-wound portion D1 on the side of the flange portion 11*b*, falls to the first layer, and the wire W1 with the turn number 7, positioned at the end of the second closely-wound portion D2 on the side of the flange portion 11*b*, falls to the first layer. Meanwhile, in an area covering the first sparsely-wound portion S1, the moving speed of the nozzle is adjusted so as to wind the wire W1 along the wire W2. That is, within the first sparsely-wound portion S1, the positional relationship between the wires W1 and W2 is the same as in the case of bifilar winding. When winding of the wire W1 is finished, the drum core 11 is stopped rotating, and the other end of the wire W1 is joined to the terminal electrode E3. Following the procedure described above, winding of the wires W1 and W2 around the winding core portion 11*a* is completed.

Returning to FIG. 4, the wires W1 and W2 are wound in order that the relationship between the number of turns counted from the flange portion 11*b* and the arrangement of a sparsely-wound portion S1, and the relationship between the number of turns counted from the flange portion 11*c* and the arrangement of a sparsely-wound portion S1 are the same with each other. In other words, the wires W1 and W2 are wound in order that the wires W1 and W2 wound on the side of the flange portion 11*b* and the wires W1 and W2 wound on the side of the flange portion 11*c* are symmetric with respect to the center of the winding core portion 11*a* in the y-direction. Specifically, according to the number of turns counted from the flange portion 11*b*, the first sparsely-wound portion S1 is arranged between the fifth turn and the seventh turn. And, according to the number of turns counted from the flange portion 11*c*, the first sparsely-wound portion S1 is also arranged between the fifth turn and the seventh turn.

By setting the relationship between the number of turns and the arrangement of the first sparsely-wound portion S1 as described above, the common mode filter 10 can be expected to exhibit almost the same characteristics both in the case where the terminal electrodes E1 and E2 are utilized as an input terminal and in the case where the terminal electrodes E3 and E4 are utilized as an input terminal. Therefore, at the time of installing the common mode filter 10 on a substrate, it is not necessary to care which of the flange portions corresponds to the terminal electrodes E1 and E2 (the mounting directionality is reduced), and accordingly it is possible to reduce the burden of installation work, and to prevent mistakes with the installation.

The relationship between the number of turns counted from the flange portion 11*b* and the arrangement of a sparsely-wound portion S1, and the relationship between the number of turns counted from the flange portion 11*c* and the arrangement of a sparsely-wound portion S1 are not necessarily completely the same with each other. It suffices that these relationships are substantially the same with each other. "Substantially the same with each other" means that a difference between those relationships is allowable, from the realistic viewpoint, as long as the mounting directionality is sufficiently reduced. For example, in the case where the total number of turns is 40, when one of the 40 turns is arranged within the first sparsely-wound portion S1 as shown in FIG. 4, then it is inevitable to arrange 19 turns within one of the first and second closely-wound portions D1 and D2, and to arrange 20 turns within the other. In this case, the wires W1 and W2 are not wound in order that the relationship between the number of turns counted from the flange portion 11*b* and the arrangement of a sparsely-wound portion S1, and the relationship between the number of turns counted from the flange portion 11*c* and the arrangement of a sparsely-wound portion S1 are completely the same with each other. However, from the realistic viewpoint, the mounting directionality is sufficiently reduced. Therefore, in this case, the wires W1 and W2 are thought to be wound in order that the relationship between the number of turns counted from the flange portion 11*b* and the arrangement of a sparsely-wound portion S1, and the relationship between the number of turns counted from the flange portion 11*c* and the arrangement of a sparsely-wound portion S1 are substantially the same with each other. These points described above are also applied to other embodiments described later and to "the relationship between the number of turns counted from each of the flange portions 11*b* and 11*c* and the falling position".

As explained above, in the common mode filter 10 according to the first embodiment, the first sparsely-wound portion S1 is provided, and also the first and second closely-wound portions D1 and D2 are provided. Therefore, both reducing the mode conversion characteristics and ensuring a high impedance can be achieved. Further, because the mounting directionality of the common mode filter 10 can be reduced, it is possible to reduce the operation burden of installing the common mode filter 10 on a substrate, and to prevent mistakes with the installation. Furthermore, because layer winding is employed, it is possible to increase the number of windings as compared to the case where bifilar winding is employed.

Figure 6:
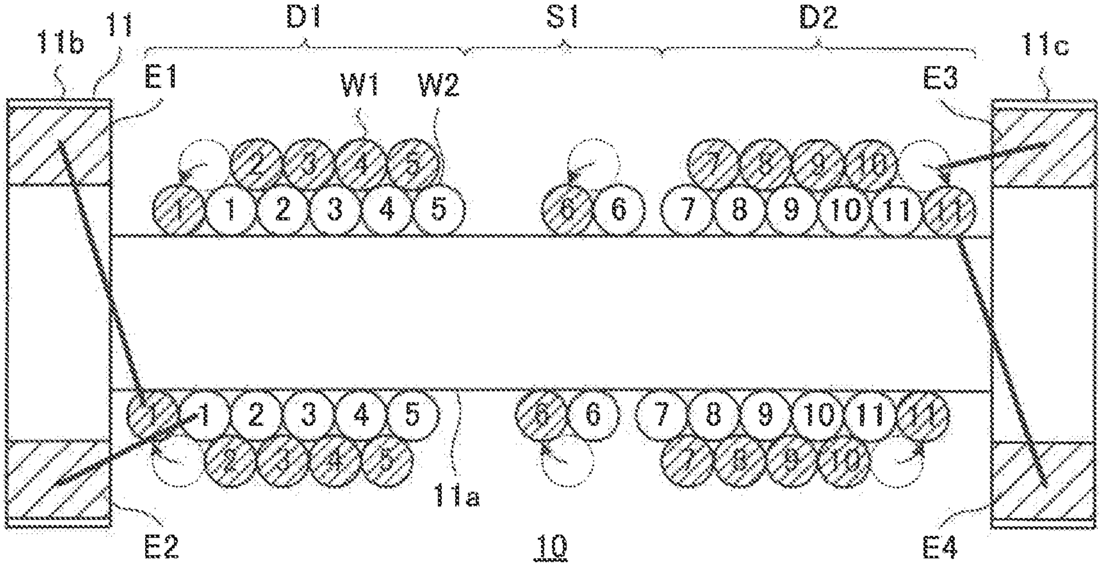
FIG. 6 is a schematic diagram showing a modification of the winding state of the wires shown in FIG. 4.

FIG. 6 is a schematic diagram showing a modification of the winding state of the wires W1 and W2 shown in FIG. 4. In the modification shown in FIG. 6, in the second closely-wound portion D2, the wires W1 and W2 are wound in order that the wire W1 with the turn number 7, positioned at the end on the side of the flange portion 11*b*, does not fall to the first layer, but the wire W1 with the turn number 11, positioned at the end on the side of the flange portion 11*c*, falls to the first layer. With this configuration, the relationship between the number of turns counted from the flange portion 11*b* and the falling position, and the relationship between the number of turns counted from the flange portion 11*c* and the falling position are the same with each other. Therefore, it is possible to further reduce the directionality of the common mode filter 10.

Figure 7:
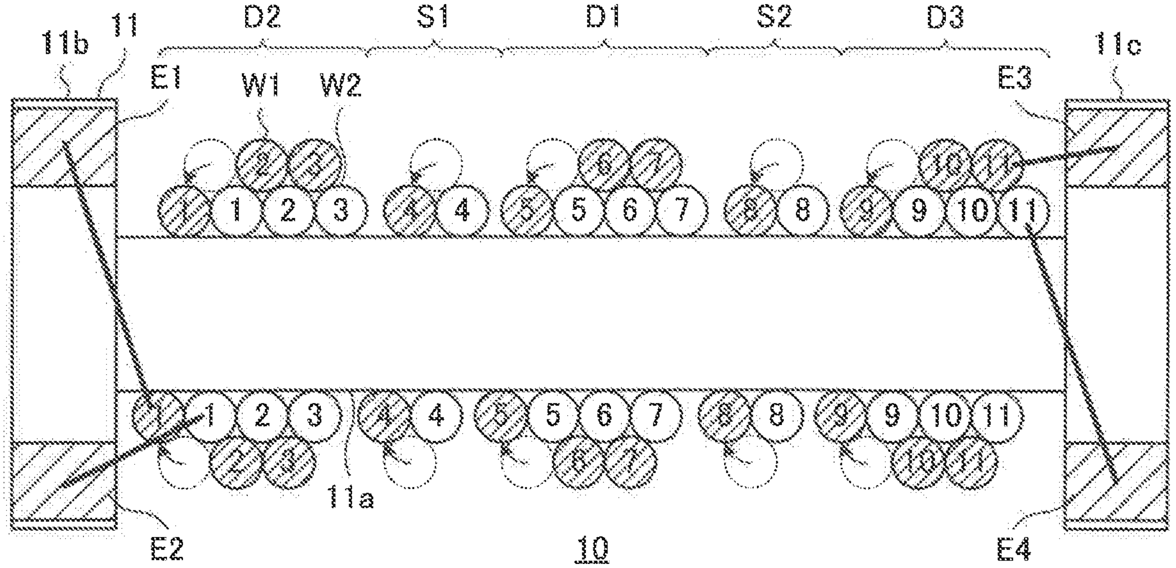
FIG. 7 is a schematic diagram showing a winding state of the wires in the common mode filter according to a second embodiment of the present invention.

FIG. 7 is a schematic diagram showing a winding state of the wires W1 and W2 in the common mode filter 10 according to a second embodiment of the present invention. The common mode filter 10 according to the second embodiment is the same as the common mode filter 10 according to the first embodiment, except for a winding mode of the wires W1 and W2. In FIG. 7, similarly to FIG. 4, an area covering the wires W1 and W2 and the winding core portion 11*a* is shown as a cross-sectional view taken along the line A-A shown in FIGS. 2B and 2D, and an area covering the flange portions 11*b* and 11*c* is shown as a top view corresponding to FIG. 2A. FIG. 7 is explained below while focusing on the differences from FIG. 4.

As shown in FIG. 7, the wires W1 and W2 according to the second embodiment include first and second sparsely-wound portions S1 and S2 in which the wires W1 and W2 are wound with adjacent pair-wires spaced from each other, and first to third closely-wound portions D1 to D3 in which the wires W1 and W2 are wound with adjacent pair-wires in close contact with each other. The second closely-wound portion D2, the first sparsely-wound portion S1, the first closely-wound portion D1, the second sparsely-wound portion S2, and the third closely-wound portion D3 are arranged in this order from the flange portion 11*b* to the flange portion 11*c*. The wires W1 and W2 with the turn numbers 1 to 3 are included in the second closely-wound portion D2. The wires W1 and W2 with the turn number 4 are included in the first sparsely-wound portion S1. The wires W1 and W2 with the turn numbers 5 to 7 are included in the first closely-wound portion D1. The wires W1 and W2 with the turn number 8 are included in the second sparsely-wound portion S2. The wires W1 and W2 with the turn numbers 9 to 11 are included in the third closely-wound portion D3. The second and third closely-wound portions D2 and D3 are not necessarily provided, and can be replaced with one turn of each of the wires W1 and W2.

By providing the first and second sparsely-wound portions S1 and S2 as described above, it is also possible for the common mode filter 10 according to the second embodiment to reduce the capacitance between different turns in the wires W1 and W2 as compared to the case where no sparsely-wound portion is provided. Therefore, the mode conversion characteristics are also reduced. Further, because the first to third closely-wound portions D1 to D3 are provided, it is possible to obtain a higher inductance as compared to the case where a space is provided between each of adjacent pair-wires.

Also in the second embodiment, the wires W1 and W2 are wound in order that the relationship between the number of turns counted from the flange portion 11*b* and the arrangement of sparsely-wound portions, and the relationship between the number of turns counted from the flange portion 11*c* and the arrangement of sparsely-wound portions are the same with each other. Specifically, according to either the number of turns counted from the flange portion 11*b* or the number of turns counted from the flange portion 11*c*, the sparsely-wound portions are arranged between the third turn and the fifth turn, and between the seventh turn and the ninth turn. Therefore, similarly to the first embodiment, the mounting directionality can be reduced, and it is possible to reduce the burden of installation work, and to prevent mistakes with the installation.

As explained above, the common mode filter 10 according to the second embodiment can also achieve both reducing the mode conversion characteristics and ensuring a high impedance. Further, because the mounting directionality of the common mode filter 10 can be reduced, it is possible to reduce the operation burden of installing the common mode filter 10 on a substrate, and to prevent mistakes with the installation. Furthermore, because layer winding is employed, it is possible to increase the number of windings as compared to the case where bifilar winding is employed.

In the second embodiment, spaces are formed nearer to the flange portions 11*b* and 11*c* as compared to the first embodiment. As the positions of the spaces are closer to the flange portions 11*b* and 11*c*, a larger effect of reducing the mode conversion characteristics can be obtained. Therefore, in the common mode filter 10 according to the second embodiment, it is possible to obtain the effect of reducing the mode conversion characteristics more efficiently (with a narrower space) as compared to the first embodiment.

Figure 8:
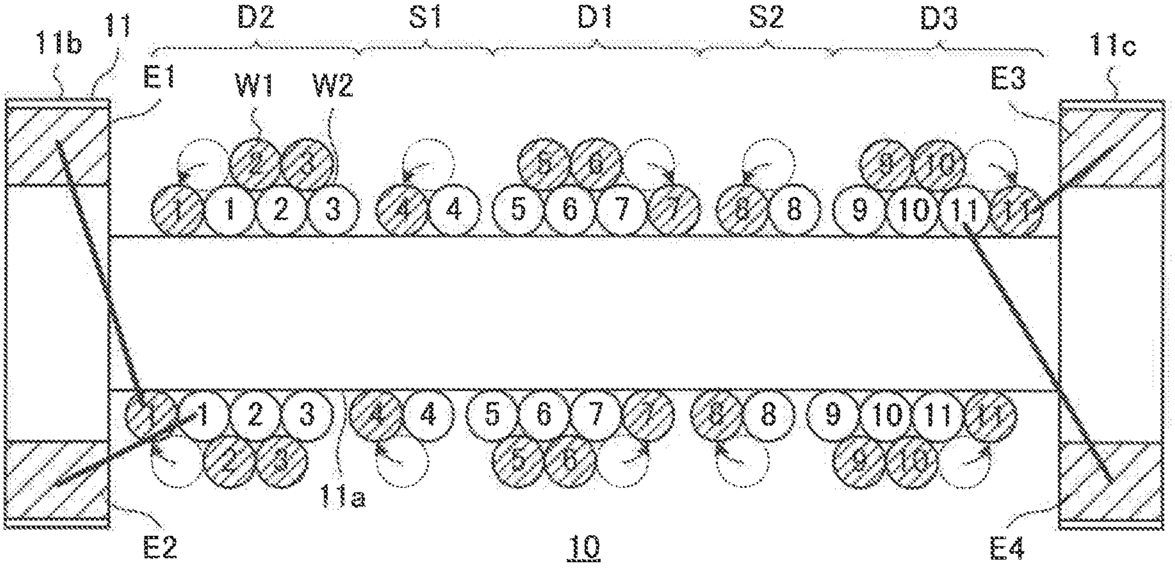
FIG. 8 is a schematic diagram showing a modification of the winding state of the wires shown in FIG. 7.

FIG. 8 is a schematic diagram showing a modification of the winding state of the wires W1 and W2 shown in FIG. 7. In the example in FIG. 7, the wire W1 with the turn numbers 1, 5, and 9, positioned at each end of the first to third closely-wound portions D1 to D3 on the side of the flange portion 11*b*, falls to the first layer. However, in the present modification shown in FIG. 8, the wire W1 with the turn numbers 7 and 11, positioned at each end of the first and third closely-wound portions D1 and D3 on the side of the flange portion 11*c*, falls to the first layer. With this configuration, the relationship between the number of turns counted from the flange portion 11*b* and the falling position, and the relationship between the number of turns counted from the flange portion 11*c* and the falling position are not exactly the same with each other, but are similar to each other (substantially the same with each other). Therefore, it is possible to further reduce the directionality of the common mode filter 10 as compared to the example in FIG. 7.

Figure 9:
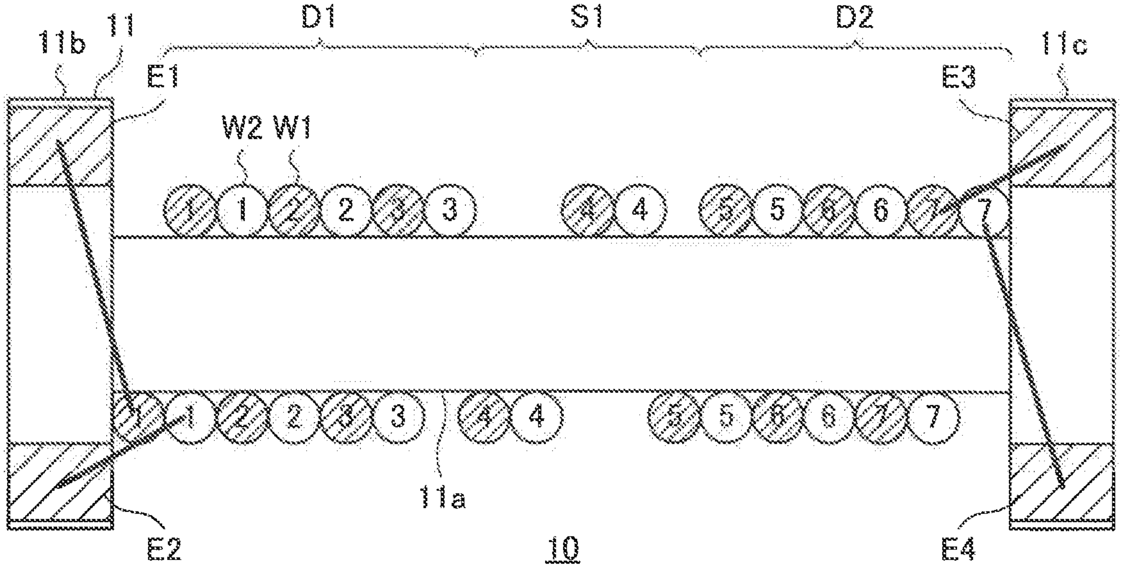
FIG. 9 is a schematic diagram showing a winding state of the wires in the common mode filter according to a third embodiment of the present invention.

FIG. 9 is a schematic diagram showing a winding state of the wires W1 and W2 in the common mode filter 10 according to a third embodiment of the present invention. The common mode filter 10 according to the third embodiment is the same as the common mode filter 10 according to the first embodiment, except for a winding mode of the wires W1 and W2. In FIG. 9, similarly to FIG. 4, an area covering the wires W1 and W2 and the winding core portion 11*a* is shown as a cross-sectional view taken along the line A-A shown in FIGS. 2B and 2D, and an area covering the flange portions 11*b* and 11*c* is shown as a top view corresponding to FIG. 2A. FIG. 9 is explained below while focusing on the differences from FIG. 4.

As shown in FIG. 9, the wires W1 and W2 according to the third embodiment are wound not by layer winding, but by bifilar winding. Meanwhile, similarly to the first embodiment, the wires W1 and W2 according to the third embodiment include the first sparsely-wound portion S1 in which the wires W1 and W2 are wound with adjacent pair-wires spaced from each other, and the first and second closely-wound portions D1 and D2 in which the wires W1 and W2 are wound with adjacent pair-wires in close contact with each other, and the first closely-wound portion D1, the first sparsely-wound portion S1, and the second closely-wound portion D2 are arranged in this order from the flange portion 11*b* to the flange portion 11*c*. Therefore, similarly to the first embodiment, in the common mode filter 10 according to the third embodiment, the capacitance between different turns in the wires W1 and W2 is reduced as compared to the case where no sparsely-wound portion is provided, and the mode conversion characteristics are also reduced. Further, it is possible to obtain a higher inductance as compared to the case where a space is provided between each of adjacent pair-wires.

Figure 10:
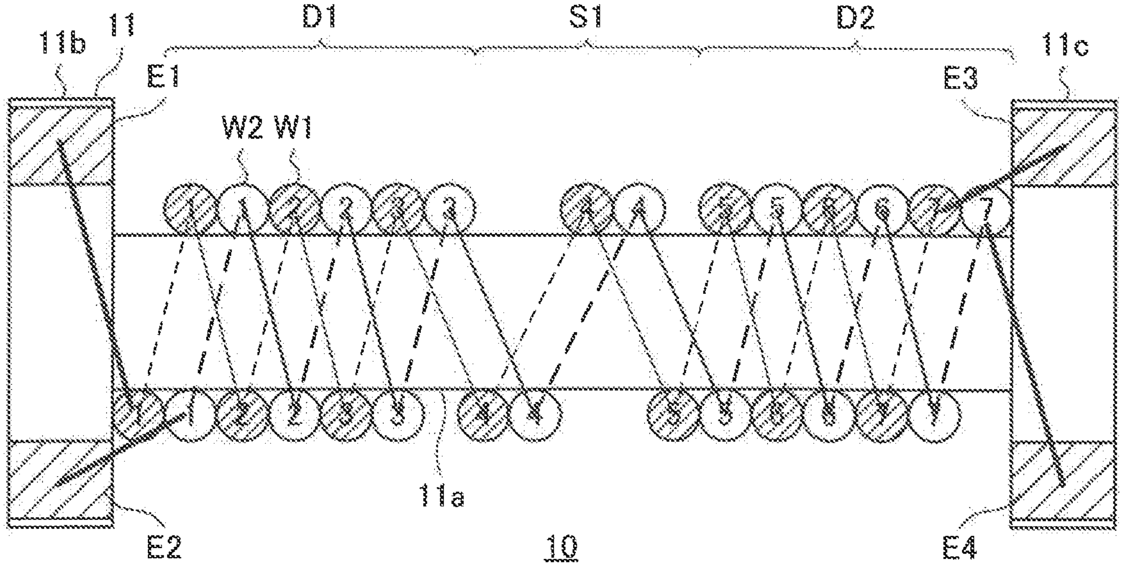
FIG. 10 is an explanatory diagram of a winding method of the wires shown in FIG. 9.

FIG. 10 is an explanatory diagram of a winding method of the wires W1 and W2 shown in FIG. 9. In FIG. 10, similarly to FIGS. 5A and 5B, each of a straight line and a broken line connects between cross sections of a wire. The straight line schematically shows the wire located on the front side of the winding core portion 11*a* in the drawing. The broken line schematically shows the wire located on the rear side of the winding core portion 11*a* in the drawing. The method of winding the wires W1 and W2 that include the first and second closely-wound portions D1 and D2, and the first sparsely-wound portion S1 by bifilar winding is briefly explained below with reference to FIG. 10.

Similarly to the first embodiment, it is preferable to use the automatic coil winder disclosed in Japanese Patent No. 4737268 as an automatic coil winder used for winding the wires W1 and W2. In the third embodiment, first, one end of the wire W1 is joined to the terminal electrode E1, and one end of the wire W2 is joined to the terminal electrode E2. Next, while the drum core 11 is rotated at a constant speed, two nozzles that feed the wires W1 and W2 respectively are moved in the y direction with their relative positional relationship maintained. At this time, in an area covering the first and second closely-wound portions D1 and D2, the moving speed of each of the nozzles is adjusted so as not to create a gap between adjacent pair-wires. In contrast, in an area covering the first sparsely-wound portion S1, the moving speed of each of the nozzles is adjusted so as to provide a space of appropriate size between adjacent pair-wires. Also in the third embodiment, the moving speed becomes slowest when the wires W1 and W2 are wound so as not to create a gap, and becomes faster as a larger space is formed. Further, it is necessary to keep the moving speed of each of the nozzles constant in the first and second closely-wound portions D1 and D2. However, the moving speed of each of the nozzles is not necessarily kept constant in the first sparsely-wound portion S1. When winding of the wires W1 and W2 is finished, the other end of the wire W1 is joined to the terminal electrode E3, and the other end of the wire W2 is joined to the terminal electrode E4.

Returning to FIG. 9, the wires W1 and W2 are wound in order that the relationship between the number of turns counted from the flange portion 11*b* and the arrangement of a sparsely-wound portion S1, and the relationship between the number of turns counted from the flange portion 11*c* and the arrangement of a sparsely-wound portion S1 are the same with each other. Specifically, according to either the number of turns counted from the flange portion 11*b* or the number of turns counted from the flange portion 11*c*, the first sparsely-wound portion S1 is arranged between the third turn and the fifth turn. Therefore, similarly to the first and second embodiments, the mounting directionality can be reduced, and it is possible to reduce the burden of installation work, and to prevent mistakes with the installation.

As explained above, the common mode filter 10 according to the third embodiment can also achieve both reducing the mode conversion characteristics and ensuring a high impedance. Further, because the mounting directionality of the common mode filter 10 can be reduced, it is possible to reduce the operation burden of installing the common mode filter 10 on a substrate, and to prevent mistakes with the installation.

Figure 11:
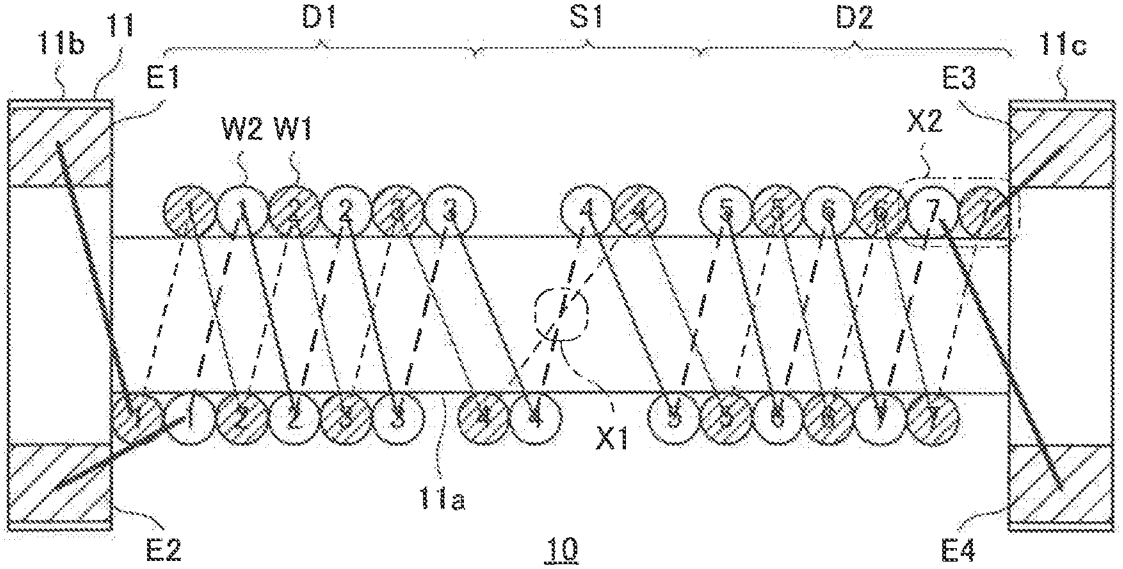
FIG. 11 is a schematic diagram showing a modification of the winding state of the wires shown in FIG. 9.

FIG. 11 is a schematic diagram showing a modification of the winding state of the wires W1 and W2 shown in FIG. 9. In FIG. 11, similarly to FIG. 10, each of a straight line and a broken line connects between cross sections of a wire. The straight line schematically shows the wire located on the front side of the winding core portion 11*a* in the drawing. The broken line schematically shows the wire located on the rear side of the winding core portion 11*a* in the drawing. In the present modification, the wires W1 and W2 cross each other (their positions are interchanged) within the first sparsely-wound portion S1 (at a position X1 shown in FIG. 11). Accordingly, the wires W1 and W2 cross each other also at the end of the second closely-wound portion D2 on the side of the flange portion 11*c* (at a position X2 shown in FIG.

11). The crossing of the wires W1 and W2 is realized by interchanging the positions of two nozzles at a corresponding position.

When the wires W1 and W2 cross each other as described above, the polarities are opposite to each other on both sides of the first sparsely-wound portion S1. Therefore, it is possible to balance the polarities. Further, the wires W1 and W2 cross each other within the first sparsely-wound portion S1 (the wires W1 and W2 with the turn number 4, which is not in close contact with its adjacent pair-wires on both sides, cross each other). Therefore, it is possible to minimize winding disarray caused by the crossing of the wires W1 and W2.

Figure 12:
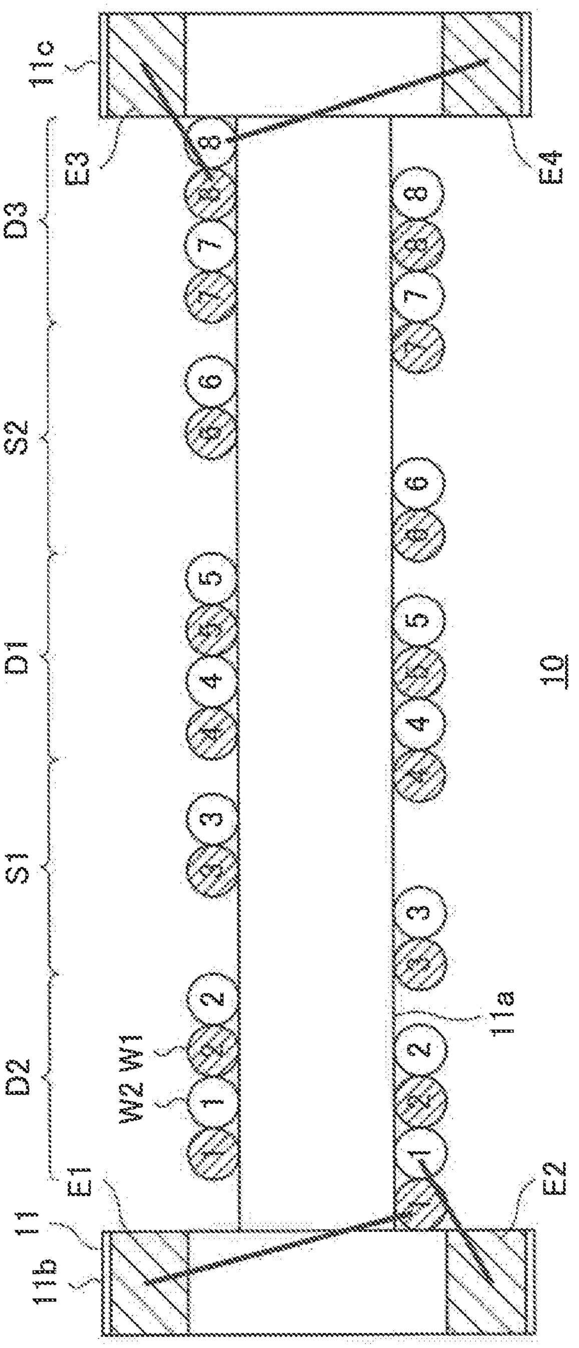
FIG. 12 is a schematic diagram showing a winding state of the wires in the common mode filter according to a fourth embodiment of the present invention.

FIG. 12 is a schematic diagram showing a winding state of the wires W1 and W2 in the common mode filter 10 according to a fourth embodiment of the present invention. The common mode filter 10 according to the fourth embodiment is the same as the common mode filter 10 according to the third embodiment, except for a winding mode of the wires W1 and W2. In FIG. 12, similarly to FIG. 4, an area covering the wires W1 and W2 and the winding core portion 11*a* is shown as a cross-sectional view taken along the line A-A shown in FIGS. 2B and 2D, and an area covering the flange portions 11*b* and 11*c* is shown as a top view corresponding to FIG. 2A. FIG. 12 is explained below while focusing on the differences from FIG. 4.

Similarly to the third embodiment, the wires W1 and W2 according to the fourth embodiment are wound not by layer winding, but by bifilar winding. Meanwhile, similarly to the second embodiment, the wires W1 and W2 according to the fourth embodiment include the first and second sparsely-wound portions S1 and S2 in which the wires W1 and W2 are wound with adjacent pair-wires spaced from each other, and the first to third closely-wound portions D1 to D3 in which the wires W1 and W2 are wound with adjacent pair-wires in close contact with each other, and the second closely-wound portion D2, the first sparsely-wound portion S1, the first closely-wound portion D1, the second sparsely-wound portion S2, and the third closely-wound portion D3 are arranged in this order from the flange portion 11*b* to the flange portion 11*c*. Therefore, similarly to the second embodiment, in the common mode filter 10 according to the fourth embodiment, the capacitance between different turns in the wires W1 and W2 is reduced as compared to the case where no sparsely-wound portion is provided, and the mode conversion characteristics are also reduced. Further, it is possible to obtain a higher inductance as compared to the case where a space is provided between each of adjacent pair-wires.

Also in the fourth embodiment, the wires W1 and W2 are wound in order that the relationship between the number of turns counted from the flange portion 11*b* and the arrangement of sparsely-wound portions, and the relationship between the number of turns counted from the flange portion 11*c* and the arrangement of sparsely-wound portions are the same with each other. Specifically, according to either the number of turns counted from the flange portion 11*b* or the number of turns counted from the flange portion 11*c*, the sparsely-wound portions are arranged between the second turn and the fourth turn, and between the fifth turn and the seventh turn. Therefore, similarly to the first to third embodiments, the mounting directionality can be reduced, and it is possible to reduce the burden of installation work, and to prevent mistakes with the installation.

As explained above, the common mode filter 10 according to the fourth embodiment can also achieve both reducing the mode conversion characteristics and ensuring a high impedance. Further, because the mounting directionality of the common mode filter 10 can be reduced, it is possible to reduce the operation burden of installing the common mode filter 10 on a substrate, and to prevent mistakes with the installation.

In the fourth embodiment, spaces are formed nearer to the flange portions 11*b* and 11*c* as compared to the third embodiment. Therefore, it is possible to obtain the effect of reducing the mode conversion characteristics more efficiently (with a narrower space) as compared to the third embodiment.

Figure 13:
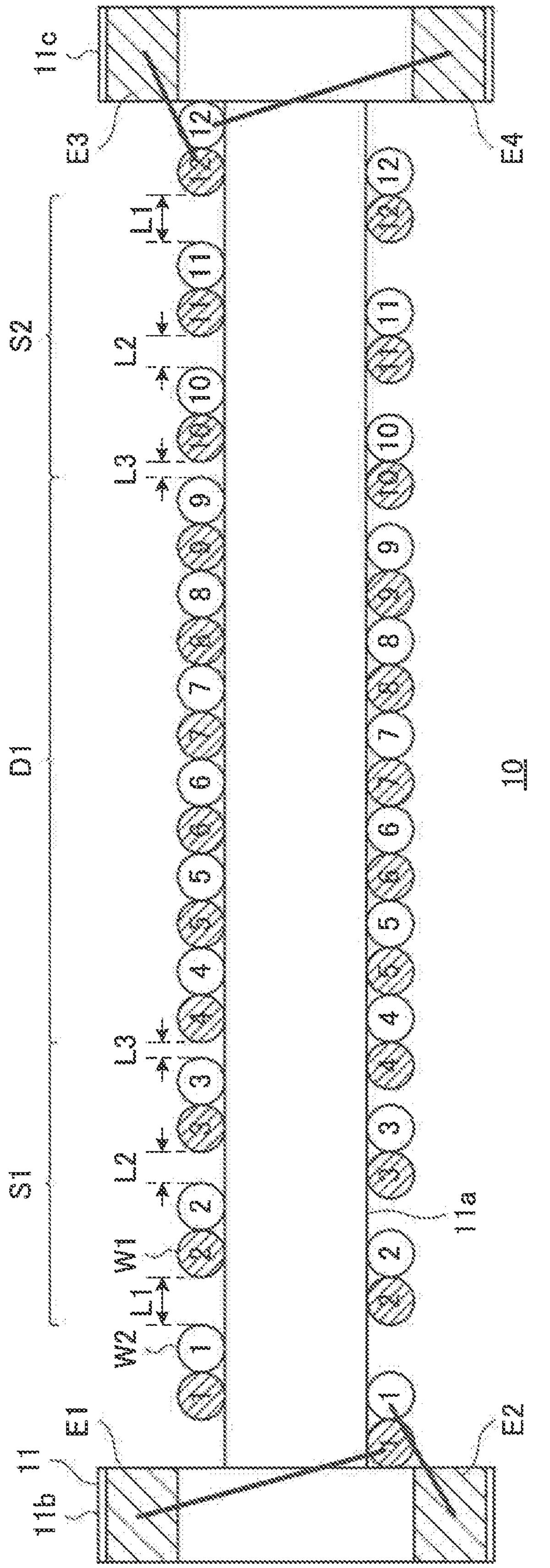
FIG. 13 is a schematic diagram showing a winding state of the wires in the common mode filter according to a fifth embodiment of the present invention.

FIG. 13 is a schematic diagram showing a winding state of the wires W1 and W2 in the common mode filter 10 according to a fifth embodiment of the present invention. The common mode filter 10 according to the fifth embodiment is the same as the common mode filter 10 according to the third and fourth embodiments, except for a winding mode of the wires W1 and W2. In FIG. 13, similarly to FIG. 4, an area covering the wires W1 and W2 and the winding core portion 11*a* is shown as a cross-sectional view taken along the line A-A shown in FIGS. 2B and 2D, and an area covering the flange portions 11*b* and 11*c* is shown as a top view corresponding to FIG. 2A. FIG. 13 is explained below while focusing on the differences from FIG. 4.

As shown in FIG. 13, the wires W1 and W2 according to the fifth embodiment are wound by bifilar winding, and include the first and second sparsely-wound portions S1 and S2 in which the wires W1 and W2 are wound with adjacent pair-wires spaced from each other, and the first closely-wound portion D1 in which the wires W1 and W2 are wound with adjacent pair-wires in close contact with each other. The first sparsely-wound portion S1, the first closely-wound portion D1, and the second sparsely-wound portion S2 are arranged in this order from the flange portion 11*b* to the flange portion 11*c*. The wires W1 and W2 with the turn numbers 2 and 3 are included in the first sparsely-wound portion S1. The wires W1 and W2 with the turn numbers 10 and 11 are included in the second sparsely-wound portion S2.

Also in the fifth embodiment, the wires W1 and W2 are wound in order that the relationship between the number of turns counted from the flange portion 11*b* and the arrangement of sparsely-wound portions, and the relationship between the number of turns counted from the flange portion 11*c* and the arrangement of sparsely-wound portions are the same with each other. Specifically, according to either the number of turns counted from the flange portion 11*b* or the number of turns counted from the flange portion 11*c*, the sparsely-wound portions are arranged between the first turn and the fourth turn, and between the ninth turn and the twelfth turn.

In the common mode filter 10 according to the fifth embodiment, the first and second sparsely-wound portions S1 and S2, and the first closely-wound portion D1 are provided, and therefore the capacitance between different turns in the wires W1 and W2 is reduced as compared to the case where no sparsely-wound portion is provided, and the mode conversion characteristics are also reduced, similarly to the first to fourth embodiments. Further, it is possible to obtain a higher inductance as compared to the case where a space is provided between each of adjacent pair-wires. Furthermore, the wires W1 and W2 are wound in order that the relationship between the number of turns counted from the flange portion 11*b* and the arrangement of sparsely-wound portions, and the relationship between the number of turns counted from the flange portion 11*c* and the arrangement of sparsely-wound portions are the same with each other. Therefore, the mounting directionality can also be reduced.

In the fifth embodiment, the arrangement of the wires W1 and W2 (with the turn numbers 2 and 3) within the first sparsely-wound portion S1 is set in order that there are distances L1, L2, and L3 between adjacent pair-wires in order from the position closest to the flange portion 11*b*, as shown in FIG. 13. Similarly, the arrangement of the wires W1 and W2 (with the turn numbers 10 and 11) within the second sparsely-wound portion S2 is set in order that there are distances L1, L2, and L3 between adjacent pair-wires in order from the position closest to the flange portion 11*c*, as shown in FIG. 13.

With this configuration, values of the distances L1 to L3 can be appropriately adjusted. Therefore, in the common mode filter 10 according to the fifth embodiment, it is easier to adjust the mode conversion characteristics to a desired value as compared to the first to fourth embodiments. In view of obtaining the effect of reducing the mode conversion characteristics more efficiently (with a narrower space), it is preferable to select specific values of the distances L1 to L3 so as to satisfy L1>L2>L3 as exemplified in FIG. 13. With this configuration, as spaces are closer to the flange portions 11*b* and 11*c*, the width of the spaces can be larger, and therefore it is possible to reduce the mode conversion characteristics efficiently.

It is apparent that the present invention is not limited to the above embodiments, but may be modified and changed without departing from the scope and spirit of the invention.

It is possible to apply the configuration as shown in the fifth embodiment for example (FIG. 13), in which the width of plural spaces within a sparsely-wound portion is appropriately adjusted, not only to the bifilar winding shown in FIG. 13, but also to layer winding. For example, also in FIG. 8, two spaces are provided within each of the first and second sparsely-wound portions S1 and S2 (on both sides of the wires W1 and W2 with the turn number 4 and on both sides of the wires W1 and W2 with the turn number 8). The width of these spaces can be appropriately adjusted, thereby adjusting the mode conversion characteristics to a desired value.

In the cross-sectional view of the wires W1 and W2 shown in FIG. 4 and the like, the length of the common mode filter 10 in the y direction is different between the embodiments only for convenience of illustration. The size of the common mode filter 10 is decided according to JIS. At the time of commercialization, the size of the common mode filter 10 is decided from among several standardized sizes (such as 0403, 0605, and 0806). Therefore, it is necessary to select and employ the common mode filter 10 that has characteristics appropriate to its size from the above embodiments. For example, a larger number of windings are obtained by layer winding than by bifilar winding from the same size. Therefore, it suffices that when the size of the common mode filter 10 is small, the layer winding is employed. For another example, when there is room for increasing the size of the common mode filter 10, it suffices that the examples in FIGS. 7 and 12 are employed, in which sparsely-wound portions are provided at a position close to the flange portions 11*b* and 11*c*. In contrast, when there is no room for increasing the size of the common mode filter 10, it suffices that the examples in FIGS. 4 and 9 are employed, in which one sparsely-wound portion is provided at the center.

Other than that, it is preferable to appropriately select a most appropriate embodiment according to required conditions, such as to employ the example in FIG. 6 in a case where reduction in the directionality is strictly required when the example in FIG. 4 is to be employed, or to employ the example in FIG. 12 in a case where fine adjustments of the mode conversion characteristics are required.

What is claimed is:

1. A coil component comprising:

a winding core; and first and second wire wound around the winding core, wherein the winding core is not wound with any wire other than the first and second wires, wherein the first wire includes a first turn, a second turn, and a third turn arranged in this order, wherein the second wire includes a first turn, a second turn, and a third turn arranged in this order, wherein the winding core includes first and second surfaces, wherein, in the first surface of the winding core, the first turn of the first wire, the first turn of the second wire, the second turn of the second wire, the second turn of the first wire, the third turn of the second wire, and the third turn of the first wire are arranged in this order, and wherein, in the second surface of the winding core, the first turn of the first wire, the first turn of the second wire, the second turn of the first wire, the second turn of the second wire, the third turn of the second wire, and the third turn of the first wire are arranged in this order.

2. The coil component as claimed in claim 1, wherein the first turn of the first wire and the first turn of the second wire contact each other on each of the first and second surfaces of the winding core.

3. The coil component as claimed in claim 2, wherein the second turn of the first wire and the second turn of the second wire contact each other on each of the first and second surfaces of the winding core.

4. The coil component as claimed in claim 3, wherein the first turn of the second wire is spaced apart from the second turn of the second wire on the first surface of the winding core so as to form a first wire space.

5. The coil component as claimed in claim 4, wherein the first turn of the second wire is spaced apart from the second turn of the first wire on the second surface of the winding core so as to form a second wire space.

6. The coil component as claimed in claim 5, wherein the third turn of the first wire and the third turn of the second wire contact each other on each of the first and second surfaces of the winding core.

7. The coil component as claimed in claim 6, wherein the second turn of the first wire is spaced apart from the third turn of the second wire on the first surface of the winding core so as to form a third wire space.

8. The coil component as claimed in claim 7, wherein the second turn of the second wire is spaced apart from the third turn of the second wire on the second surface of the winding core so as to form a fourth wire space.

9. The coil component as claimed in claim 1, wherein each of the first turn of the first wire, the first turn of the second wire, the second turn of the second wire, the second turn of the first wire, the third turn of the second wire, and the third turn of the first wire contacts with the first surface of the winding core.

10. The coil component as claimed in claim 5, wherein the first wire space is greater than the second wire space.

11. The coil component as claimed in claim 7, wherein the first wire space is greater than the third wire space.

12. A coil component comprising:

a winding core; and first and second wire wound around the winding core, wherein the first wire includes a first turn, a second turn, and a third turn arranged in this order, wherein the second wire includes a first turn, a second turn, and a third turn arranged in this order, wherein the winding core includes first and second surfaces, wherein, in the first surface of the winding core, the first turn of the first wire, the first turn of the second wire, the second turn of the second wire, the second turn of the first wire, the third turn of the second wire, and the third turn of the first wire are arranged in this order, wherein, in the second surface of the winding core, the first turn of the first wire, the first turn of the second wire, the second turn of the first wire, the second turn of the second wire, the third turn of the second wire, and the third turn of the first wire are arranged in this order, wherein the first turn of the second wire is spaced apart from the second turn of the second wire on the first surface of the winding core so as to form a first wire space, wherein the first turn of the second wire is spaced apart from the second turn of the first wire on the second surface of the winding core so as to form a second wire space, and wherein the first wire space is greater than the second wire space.

13. The coil component as claimed in claim 12, wherein the second turn of the first wire is spaced apart from the third turn of the second wire on the first surface of the winding core so as to form a third wire space, and wherein the first wire space is greater than the third wire space.

14. The coil component as claimed in claim 13, wherein the second turn of the second wire is spaced apart from the third turn of the second wire on the second surface of the winding core so as to form a fourth wire space, and wherein the fourth wire space is greater than each of the second and third wire spaces.

15. The coil component as claimed in claim 12, wherein each of the first turn of the first wire, the first turn of the second wire, the second turn of the second wire, the second turn of the first wire, the third turn of the second wire, and the third turn of the first wire contacts with the first surface of the winding core without any wire other than the first and second wires interposed therebetween.

16. The coil component as claimed in claim 12, wherein each of the first and second wires does not contact with any wire other than the first and second wires on the winding core.

17. A coil component comprising:

a winding core; and first and second wire wound around the winding core, wherein the first wire includes a first turn, a second turn, a third turn, a fourth turn, and fifth turn arranged in this order, wherein the second wire includes a first turn, a second turn, a third turn, a fourth turn, and fifth turn arranged in this order, wherein the winding core includes first and second surfaces, wherein each of the first, second, third, fourth, and fifth turns of the first wire contacts with the first and second surfaces of the winding core, wherein each of the first, second, third, fourth, and fifth turns of the second wire contacts with the first and second surfaces of the winding core, wherein, in the first surface of the winding core, the first turn of the first wire, the first turn of the second wire, the second turn of the first wire, the second turn of the second wire, the third turn of the second wire, the third turn of the first wire, the fourth turn of the second wire, the fourth turn of the first wire, the fifth turn of the second wire, and the fifth turn of the first wire are arranged in this order, wherein, in the second surface of the winding core, the first turn of the first wire, the first turn of the second wire, the second turn of the first wire, the second turn of the second wire, the third turn of the first wire, the third turn of the second wire, the fourth turn of the second wire, the fourth turn of the first wire, the fifth turn of the second wire, and the fifth turn of the first wire are arranged in this order, wherein the first turn of the second wire and the second turn of the first wire contact each other on each of the first and second surfaces of the winding core, wherein the fourth turn of the first wire and the fifth turn of the second wire contact each other on each of the first and second surfaces of the winding core, wherein the second turn of the second wire is spaced apart from the third turn of the second wire on the first surface of the winding core so as to form a first wire space, wherein the second turn of the second wire is spaced apart from the third turn of the first wire on the second surface of the winding core so as to form a second wire space, wherein the third turn of the first wire is spaced apart from the fourth turn of the second wire on the first surface of the winding core so as to form a third wire space, and wherein the third turn of the second wire is spaced apart from the fourth turn of the second wire on the second surface of the winding core so as to form a fourth wire space.

18. The coil component as claimed in claim 17, wherein each of the first and fourth wire spaces is greater than each of the second and third wire spaces.

19. The coil component as claimed in claim 18, wherein the first turn of the first wire and the first turn of the second wire contact each other on each of the first and second surfaces of the winding core, wherein the second turn of the first wire and the second turn of the second wire contact each other on each of the first and second surfaces of the winding core, wherein the third turn of the first wire and the third turn of the second wire contact each other on each of the first and second surfaces of the winding core, wherein the fourth turn of the first wire and the fourth turn of the second wire contact each other on each of the first and second surfaces of the winding core, and wherein the fifth turn of the first wire and the fifth turn of the second wire contact each other on each of the first and second surfaces of the winding core.

20. The coil component as claimed in claim 19, wherein each of the first and second wires does not contact with any wire other than the first and second wires on the winding core.

* * * * *